June 24, 1958 H. R. DOBSON 2,840,703

TELEVISION SYNCHRONIZING SIGNAL SEPARATOR

Filed Sept. 11, 1953

INVENTOR
HAROLD DOBSON
BY John A. Harvey
ATTORNEY 2,840,703

TELEVISION SYNCHRONIZING SIGNAL SEPARATOR

Harold R. Dobson, Clarence, N. Y., assignor to Sylvania Electric Products Inc., a corporation of Massachusetts Application September 11, 1953, Serial No. 379,682
3 Claims. (Cl. 250—27)

Figure 1:
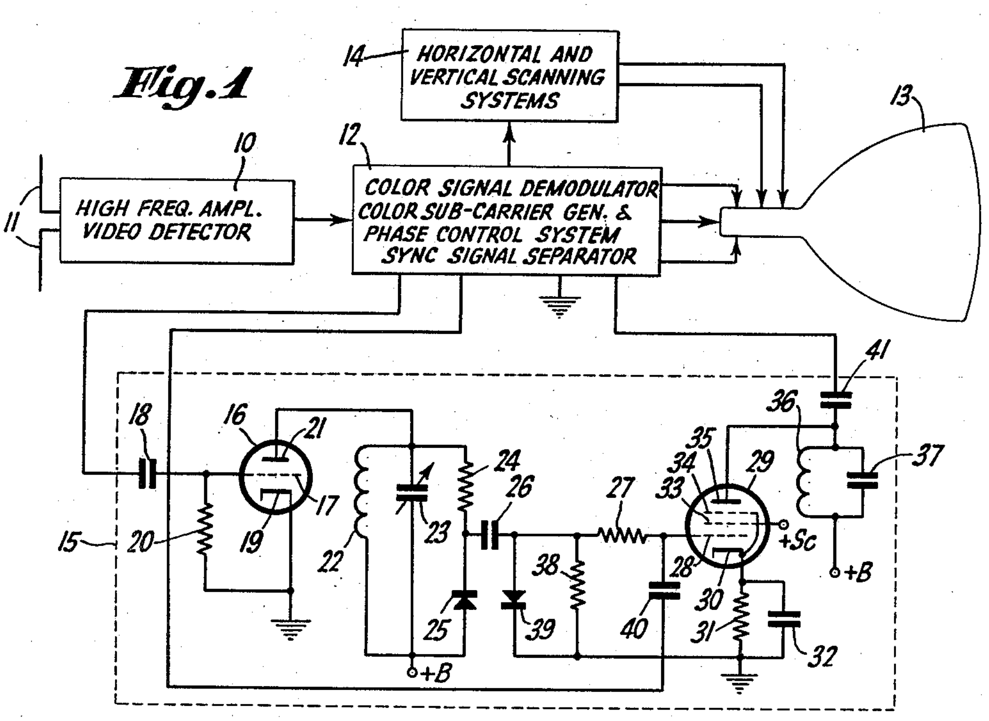

The present invention relates to television synchronizing signal separators, and, particularly, to such separators used in a color television receiver to derive the color burst synchronizing signal which controls the frequency and phase of the local sub-carrier signal generator.

The sub-carrier form of color television system transmits two of the color signals with reduced bandwidth and as modulation components of a color sub-carrier signal which has a frequency, conventionally 3.58 megacycles, lying within but near the upper frequency limit of the frequency spectrum of the third color signal. In the television receiver, a signal of sub-carrier frequency is locally generated by a color sub-carrier generator and is applied to color signal demodulators to derive the two color sigals. Accurate phase synchronization of the locally generated sub-carrier signal with the transmitted sub-carrier signal is necessary for proper color rendition. To maintain this synchronization, a color burst comprising 8 cycles from the transmitter sub-carrier generator is transmitted immediately following each horizontal synchronizing pulse. This synchronizing burst is compared in a phase detector with the signal of the local sub-carrier generator, and phase differences evident during the comparison develop a control potential in the output circuit of the phase detector. This control potential is applied to an automatic frequency and phase control system which so controls the local sub-carrier generator as to maintain it in accurate phase synchronization with the transmitted sub-carrier signal.

It is necessary to separate the color synchronizing burst from the composite video signal before using the burst in the phase detector last mentioned. It has been proposed that this be accomplished by applying the composite synchronizing signal, which includes the horizontal synchronizing pulses and color bursts, to an amplifier stage which normally is biased to a non-translating condition and by simultaneously applying to the stage a signal of pulse wave form of which each pulse occurs in time coincidence with the color synchronizing burst and has a pulse duration very slightly longer than that of the burst. Each such pulse biases the amplifier stage to its signal translating condition so that there appears in the output circut of the stage the periodic color synchronizing bursts separated from all other synchronizing signal components. This amplifier stage is commonly referred to as a "gated" color synchronizing burst separator, and the signal of pulse wave form used to control its operation is called a "gating" signal.

It has heretofore been proposed that the gating signal be derived by translating the horizontal synchronizing pulses through an electrical delay device to the color burst separator, the delay device being designed to provide an electrical delay in microseconds equal to the duration of the horizontal synchronizing pulse plus approximately one microsecond. This delay device may take the form of a passive delay line comprising a network of lumped or distributed inductive and capacitive elements, or an equivalent result may be accomplished by any of numerous forms of relaxation oscillator of the multi-vibrator type. These proposed methods of providing the gating signal have the disadvantage of unduly complex circuitry, and therefore are not as simple and cheap as is desirable for use in home entertainment television receivers or like apparatus of this nature. Also good clean separation of the color bursts is more difficult to accomplish and requires more careful design than is desirable for many applications.

It is an object of the invention, therefore, to provide a new and improved color television synchronizing burst separator which avoids one or more of the limitations and disadvantages of prior separators heretofore proposed.

It is a further object of the invention to provide a novel television synchronizing signal separator of simple and inexpensive construction yet one characterized by high precision and reliability in operation.

It is an additional operation of the invention to provide an improved color synchronizing signal separator in which the duration of each pulse of the gating signal and the time coincidence of that pulse with relation to a color burst may be easily and readily selected and adjusted at will.

Figure 2:
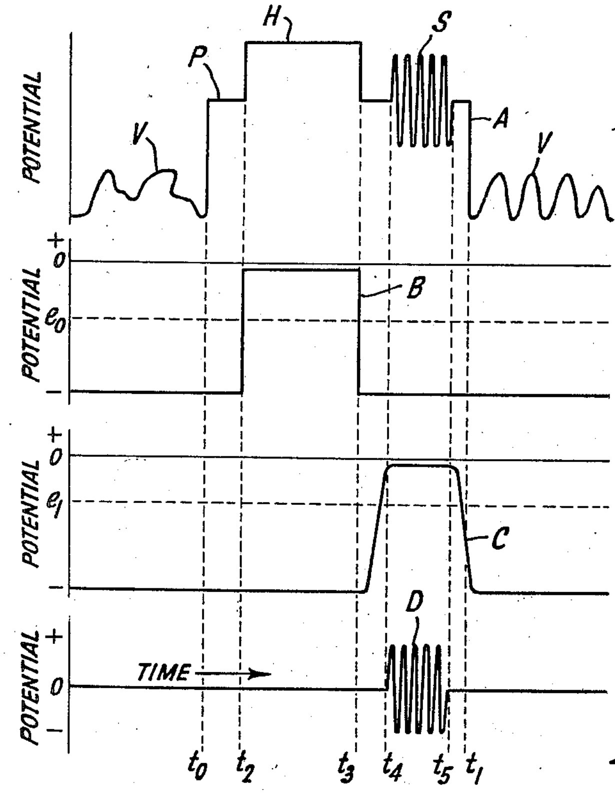

For a better understanding of the present invention, together with other and further objects thereof, reference is had to the following description taken in connection with the accompanying drawings in which:

Fig. 1 is a circuit diagram, partly schematic, showing a complete color television receiver which includes a television synchronizing signal separator embodying the present invention in a particular form; and Fig. 2 graphically represents certain voltage relationships occurring at selected points in the receiver and is used as an aid in explaining the operation of the separator.

Referring now more particularly to Fig. 1, the televison receiver includes a unit 10 having an input circuit coupled to an antenna 11 and an output circuit coupled to a unit 12. The unit 10 is conventional and includes a high frequency amplifier and video detector, and unit 12 is also conventional and includes a color signal demodulator, a color sub-carrier generator and associated phase control system, and a synchronizing signal separator. The color picture signals developed in the output circuit of the unit 12 are applied to the input electrodes of an image reproducer 13 of the cathode-ray tube type, and separated horizontal and vertical synchronizing pulses are applied to control the synchronized operation of a unit 14. The latter includes conventional horizontal and vertical scanning systems employed to generate and supply scanning signals of saw tooth wave form to horizontal and vertical scanning windings positioned in conventional manner about the neck of the image reproducer 13. The separated horizontal synchronizing signal components with associated color bursts are also applied from the unit 12 to an input circuit of a television synchronizing signal separator 15, the detailed arrangement and operation of which will be described hereinafter, and the output circuit of the latter unit is coupled to the phase detector of the unit 12.

With the exception of the synchronizing signal separator 15, the construction and operation of the color television receiver thus far described is conventional in that a color television signal received by the antenna 11 is applied to the unit 10 where it is amplified, detected and thereafter applied to the unit 12. The latter unit derives the three color television signals from the video signal and applies them to the input electrodes of the image reproducer 13, the unit 15 operating to separate the color synchronizing burst of the video signal for application to the phase detector of unit 12 to maintain accurate phase synchronization of its locally generated sub-carrier signal with the transmitted sub-carrier signal. The horizontal and vertical synchronizing components of the received signal are separated in the unit 12 and are applied to the respective horizontal and vertical scanning systems of unit 14 to control the synchronized operations thereof. The scanning signals applied from the output circuits of the unit 14 to the horizontal and vertical scanning windings associated with the neck of the image reproducer 13 cause the cathode-ray beam of the reproducer 13 to trace a raster of horizontal lines to reproduce the color television image picture.

Referring now more particularly to the portion of the receiver embodying the present invention, the television synchronizing signal separator 15 includes an amplifier tube 16 having a control electrode 17 coupled through a condenser 18 to the synchronizing signal separator of the unit 12. The cathode 19 of the tube 16 is connected directly to ground, and a resistor 20 of relatively large value is connected between the control electrode 17 and the cathode 19. The anode 21 of tube 16 is connected to a source of potential, indicated as +B, through a parallel resonant circuit comprising an inductor 22 and shunt-connected condenser 23 which may be of the fixed or adjustable type but is shown adjustable for a purpose presently to be explained. Connected in shunt to the parallel resonant circuit 22, 23 is a series circuit which includes a resistor 24 and a uni-directional conductive device 25 comprising a diode rectifier which may conveniently be a crystal diode of the 1N34 type.

The junction of the resistor 24 and rectifier device 25 is connected through a condenser 26 and a resistor 27 to a control electrode 28 of an amplifier tube 29. The latter includes a cathode 30 which is connected to ground through a cathode resistor 31 and shunt-connected condenser 32, a screen electrode 33 which is connected to a source of potential indicated as +Sc., a suppressor electrode 34 which is connected to the cathode 30, and an anode 35 which is connected to the source of potential +B through a parallel-resonant circuit comprising an inductor 36 and shunt-connected condenser 37. As shown, there is connected between ground and the junction of the condenser 26 and resistor 27 a resistor 38 and shunt-connected uni-directional conductive device 39 comprising a rectifier of the diode type and which may be conveniently a crystal diode of the 1N34 type. The control electrode 28 of tube 29 is coupled through a condenser 40 to the synchronizing signal separator of unit 12 to have applied to the control electrode the separated horizontal synchronizing signal pulses with their associated color synchronizing bursts. The anode 35 of tube 29 is coupled through a condenser 41 to the phase detector of unit 12.

Considering now the operation of the synchronizing signal separator just described, and referring to the curves of Figure 2, Curve A represents a portion of a video signal derived by the video detector of unit 10 and applied to the unit 12. This signal includes the video components V, a "pedestal" P of duration $t_0$—$t_1$, a horizontal synchronizing pulse H superimposed upon the pedestal P and of duration $t_2$—$t_3$, and a color synchronizing burst S of 9 cycles occurring within the interval $t_4$—$t_5$ starting a short interval $t_3$—$t_4$ of approximately 1 microsecond after the termination of the horizontal synchronizing pulse H and ending a small interval $t_5$—$t_1$ before the termination of the pedestal P. The color synchronizing burst S has a frequency, usually 3.58 megacycles, corresponding to that of the sub-carrier generator at the transmitter as earlier mentioned.

The separated horizontal synchronizing pulses represented by curve B, with possibly the color bursts S or some residium thereof not shown, are applied with positive polarity from unit 12 through the condenser 18 to the control electrode 17 of tube 16 and the control electrode 17 becomes slightly conductive during each horizontal synchronizing pulse to develop in conventional manner across the resistor 20 a relatively large negative self-bias potential which maintains the tube 16 non-conductive in the intervals between the horizontal synchronizing pulses. The negative control potential required to maintain the tube 16 at anode current cut-off is represented by the horizontal line $e_0$ in Fig. 2. Anode current thus flows in tube 16 during the interval $t_2$—$t_3$ of each horizontal synchronizing pulse, and this current flows through the inductor 22 constituting the inductive branch of the oscillatory circuit 22, 23. The rectifier device 25 is connected with such polarity that it is non-conductive during the period of voltage build-up across the inductor 22.

When the anode current of tube 16 is interrupted after each horizontal synchronizing pulse at time $t_3$, the magnetic field of the inductor 22 begins to collapse producing an oscillatory condition in the parallel-resonant oscillatory circuit 22, 23. The first swing of this oscillation is positive, as represented by curve C of Fig. 2. The value of the resistor 24 is selected approximately equal to that required critically to damp the oscillatory circuit 22, 23 in order that the first positive oscillation shall have the maximum possible amplitude and yet there shall be no further portions of later oscillations occurring across the oscillatory circuit 22, 23.

It will be appreciated that during those intervals when the rectifier device 25 is conductive the resistor 24 is effectively connected in shunt to the oscillatory circuit 22, 23 and thus provides the desired damping action to derive the single pulse represented by curve C following each horizontal synchronizing signal pulse H. At the same time, during periods of anode current cut-off in tube 16 when the rectifier device is non-conductive, the resistor 24 is effectively isolated from the oscillatory circuit 22, 23 so that the oscillatory circuit has its highest Q (Q being defined conventionally as a ratio of resistance to reactance of the circuit) with the result that a much larger pulse is derived across the oscillatory circuit than could be obtained from a simple critically damped circuit such as would be provided by connecting the resistor 24 directly across the oscillatory circuit 22, 23. Thus the rectifier device 25 operates as a form of switch automatically to isolate the resistor 24 from the oscillatory circuit 22, 23 during periods when the voltage is building up in the positive sense across the inductor 22 and automatically to connect the resistor 24 across the oscillatory circuit 22, 23 during periods when the voltage across the inductor 22 is building up in the negative sense. This action has the further effect that the amplifier 16 operates with a very narrow band-width during the intervals it translates the relatively low periodicity horizontal synchronizing signal pulses so that it has large attenuation at the much higher frequency of the color synchronizing burst. The oscillatory circuit tube 22, 23 is tuned to a frequency of approximately 200 kilocycles for reasons presently to be explained, and this also aids in minimizing the translation of any color burst component which may be applied to the control electrode 17 of the tube 16 by virtue of complete lack of or incomplete separation of the horizontal synchronizing pulses and color bursts in the unit 12.

The periodic gating pulses thus developed, and of which one is represented by curve C of Fig. 2, are applied with positive polarity as a gating signal through the condenser 26 and resistor 27 to the control electrode 28 of the separator tube 29. The rectifier device 39 is rendered conductive during the peaks of the gating pulses to develop in conventional manner across the resistor 38 a negative potential $e_1$, shown in association with curve C, which is effective to bias the tube 29 to anode current cut-off during the intervals between gating pulses. The frequency of oscillation of the oscillatory circuit 22, 23 is selected or adjusted by adjustment of the condenser 23 to have a value of approximately 200 kilocycles, although this frequency is not too critical, and this frequency and the values of the condenser 26, the resistor 38, and possibly the resistor 27 are selected to have values in relation to the amplitude of the gating pulses such that the tube 29 is rendered conductive by each gating pulse just prior to the time of occurrence $t_4$ of the synchronizing burst and remains conductive until a time just subsequent to the termination at time $t_5$ of the burst but preferably prior to the time $t_1$ of termination of the pedestal S.

At the same time there is applied to the control electrode 28 of tube 29, through the condenser 40, at least that portion of the video signal applied to unit 12 which includes the horizontal synchronizing pulses H and the color synchronizing bursts S which preferably although not necessarily are separated at this time from the video signal components V. Since the tube 29 is rendered conductive by the gating pulses only during the interval $t_4$—$t_5$ of occurrence of the color synchronizing burst, only this portion of the composite signal applied to its control electrode 28 through the condenser 40 is repeated to the output circuit of the tube 29. The resonant circuit 36, 37 included in the output circuit of tube 29 is tuned to the frequency of the color burst, usually 3.58 megacycles, so that the tube 29 with its resonant circuit 36, 37 operates as a high gain amplifier at the color burst frequency. The cathode resistor 31 and condenser 32 have their conventional function of providing normal control electrode-cathode bias for this purpose. There is accordingly developed across the resonant circuit 36, 37 trains of high amplitude oscillations of color burst frequency, and these are applied through the condenser 41 to the phase detector of unit 12 to control in conventional manner the phased operation of the local sub-carrier generator in the latter unit. Curve D represents that portion of the high-frequency oscillations thus applied to unit 12 which occur during the interval $t_4$—$t_5$ of the color burst, this portion being that providing the most accurate phase synchronization of the local sub-carrier generator, but it will be appreciated that the oscillations developed across the resonant circuit 36, 37 continue beyond the termination at time $t_5$ of the color burst and decay in amplitude at a rate dependent upon the inherent resistance of the resonant circuit 36, 37.

The use of the diode rectifier 39 prevents the control electrode 28 from drawing current during the interval of the gating puse. Control-electrode current drawn during this period would tend to load down the input impedance for the color synchronizing burst which is coupled through the condenser 40 to the control electrode 28. The rectifier 39 in operation requires some energy to be supplied from each gating pulse, and accordingly slightly "levels off" the normally rounded peaks of the gating pulses. The "clipping" action received here and also possibly in the large series resistor 27 insures a reasonably square topped gating pulse at the control electrode 28 of the gated amplifier 29.

While there has been described what is at present considered to be a preferred embodiment of the invention, it will be apparent to those skilled in the art that various changes and modifications may be made therein without departing from the invention. Consequently, the appended claims should be interpreted broadly, as may be consistent with the spirit and scope of the invention.

What I claim is:

1. A television synchronizing signal separator comprising, an oscillatory circuit, an amplifier having input electrodes coupled to a source of pulse potentials and output electrodes including an anode coupled to said oscillatory circuit to develop thereacross a control voltage of pulse wave form of which each pulse follows in point of time a corresponding potential pulse applied to said input electrodes, a series circuit connected in shunt to said oscillatory circuit and including an oscillation-damping resistive impedance and a uni-directional conductive device, said device having a polarity opposing flow of current in said series circuit during build up of current through the inductive branch of said oscillatory circuit which produces said control voltage pulse, and a second amplifier having output electrodes included in an output circuit and input electrodes included in a self-bias circuit coupled to said oscillatory circuit to develop by peak rectification of said control pulses output circuit current pulses delayed by a pre-determined interval from the termination of said oscillatory circuit current pulse.

2. A color television synchronizing signal separator comprising, an oscillatory circuit, signal translation means coupled to a source of horizontal synchronizing pulses and having an output circuit including said oscillatory circuit to develop thereacross a control voltage of pulse wave form of which each pulse is initiated upon the termination of a corresponding synchroninzing pulse, additional translating means coupled to said oscillatory circuit to develop from said control pulses a self-bias which biases said additional translating means to a translating condition during the major portion of each control pulse and a non-translating condition during intervals between said control pulses, said additional translating means being coupled to said oscillatory circuit through a series circuit connected in shunt to said oscillatory circuit and including an oscillation-damping resistive impedance and a uni-directional conductive device polarized to oppose flow of current in said series circuit during control voltage pulse output from said oscillatory circuit, and means for applying to said additional translating means high-frequency color synchronizing bursts occurring in delayed relation to said synchronizing pulses to develop in an output circuit of said additional translating means during each pulse of said control voltage oscillations having the frequency of said color synchronizing bursts.

3. A television synchronizing signal separator comprising a pulse source, an oscillatory circuit, an amplifier having an input circuit coupled to said pulse source and an output coupled to shock excite said oscillatory circuit into oscillation upon termination of such input pulse, a damping circuit coupled across said oscillatory circuit comprising a resistive means and unidirectional conductive means connected in series, said unidirectional conductive means being connected with such polarity as to oppose current flow through said resistance means during the first half cycle of oscillation and to pass current on the second half cycle of oscillation of said oscillatory circuit, a gating amplifier having an input circuit coupled to peak rectify the output of said oscillatory circuit, a source of synchronizing signals coupled to the input of said gating amplifier, whereby said gating amplifier passes synchronizing signals occurring during the peak rectification period.

References Cited in the file of this patent

UNITED STATES PATENTS

| | | |
|---|---|---|
| 2,411,547 | Labin et al. | Nov. 26, 1946 |
| 2,440,278 | Labin et al. | Apr. 27, 1948 |
| 2,443,619 | Hopper | June 22, 1948 |
| 2,444,455 | Labin et al. | July 6, 1948 |
| 2,468,058 | Grieg | Apr. 26, 1949 |
| 2,495,780 | Shepherd | Jan. 31, 1950 |
| 2,585,929 | Gruen | Feb. 19, 1952 |
| 2,585,930 | Gruen | Feb. 19, 1952 |
| 2,653,187 | Luck | Sept. 22, 1953 |